United States Patent
Depuydt et al.

(10) Patent No.: US 7,132,502 B2
(45) Date of Patent: *Nov. 7, 2006

(54) WATER-THINNABLE POLYMER PRECURSORS, THEIR PREPARATION AND USE

(75) Inventors: Lieven Depuydt, Meise (BE); Hugues Van Den Bergen, Brussels (BE); Marc Decaux, Uccle (BE); Thierry Randoux, Braine l'Alleud (BE)

(73) Assignee: Surface Specialties, S.A., Bruxelles (BE)

( * ) Notice: Subject to any disclaimer, the term of this patent is extended or adjusted under 35 U.S.C. 154(b) by 33 days.

This patent is subject to a terminal disclaimer.

(21) Appl. No.: 10/518,045

(22) PCT Filed: Jun. 30, 2003

(86) PCT No.: PCT/EP03/06907

§ 371 (c)(1),
(2), (4) Date: Jan. 6, 2005

(87) PCT Pub. No.: WO2004/003054

PCT Pub. Date: Jan. 8, 2004

(65) Prior Publication Data

US 2005/0234212 A1    Oct. 20, 2005

(30) Foreign Application Priority Data

Jul. 1, 2002  (EP) .................. 02014537

(51) Int. Cl.
*C08F 6/00* (2006.01)
(52) U.S. Cl. .................. 528/480; 526/127; 528/481; 585/329
(58) Field of Classification Search .......... 528/271, 528/272, 398; 562/22
See application file for complete search history.

(56) References Cited

U.S. PATENT DOCUMENTS 4,269,727 A * 5/1981 Atchison et al. ............ 522/43
6,194,605 B1 * 2/2001 Kleiner ....................... 562/22

OTHER PUBLICATIONS

Patent Abstracts of Japan, vol. 2000, No. 23, Feb. 10, 2001, Abstract of JP 2001-159050A, Jun. 12, 2001.
Patent Abstracts of Japan, vol. 004, No. 098 (C-018),Abstract of JP 55-060524A, May 7, 1980.

* cited by examiner

*Primary Examiner*—Terressa Boykin
(74) *Attorney, Agent, or Firm*—Wenderoth, Lind & Ponack, L.L.P.

(57) ABSTRACT

The present invention is directed towards water-thinnable phosphorous-containing polymers precursors, their preparation and use. The precursors of the invention are useful in compositions for preparing coatings which impart and/or exhibit resistance to attack, for example which are useful as flame-retardant coatings.

22 Claims, No Drawings

WATER-THINNABLE POLYMER PRECURSORS, THEIR PREPARATION AND USE

The present invention is directed towards water-thinnable phosphorous-containing polymer precursors, their preparation and use. The precursors of the invention are useful in compositions for preparing coatings which impart and/or exhibit resistance to attack, for example which are useful as flame-retardant coatings.

There is a continuing need for new materials exhibiting an improved resistance to attack, for example improved flame retardants. Furthermore, there is a need for materials which, while possessing the above properties, are polymerisable, for example in the form of a coating, as a thin or thick layer. Polymerisation may be achieved by any suitable method. Preferred methods are thermal curing or irradiation, for example using ultraviolet radiation and/or ionising radiation, such as gamma rays, X-rays or an electron beam.

The use of phosphorous containing materials as flame retardants is well known. It is believed that in the presence of a flame source they act by, for example, forming phosphoric and polyphosphoric acids of low volatility which catalyse the decomposition of organic compounds to carbon (char) and water. Non volatile phosphorous containing compounds may also coat the char to protect it from further oxidation, and this may act as a physical barrier and/or reduce the permeability of the char. It is believed that in general the greater the phosphorous content of the material the better its flame resistance.

It will be appreciated that the desire for imparting improved flame resistance by incorporating an increasing phosphorous content must also be balanced by the corresponding reduction in the proportion of other components in the treated or modified material. The overall physicochemical and mechanical properties of the resultant material must be maintained within limits acceptable for its end use.

The use of a halogen-containing monomer to prepare a flame-retardant composition is undesirable. In fire halogen groups can generate toxic and corrosive combustion products. These corrosive gases, in addition to their toxic properties cause significant damage to electronic components, present in particular in computers, which very often results in the loss of essential data and irreparable damage, often worse than the fire itself. The combustion products from halogen-containing materials may even be as dangerous as combustion products from materials untreated with flame-retardants. It is also undesirable to use halogen compounds for other reasons such as their potentially undesirable effect on the environment Therefore, preferably the polymers and polymer precursors of the invention are substantially free of halogen.

Many previous phosphorous containing flame retardants have been non-copolymerisable compounds and/or required additional halogenated compounds as additives to improve flame retardant properties. In conventional plastics, flame retardation of polymers has been achieved by the use of flame retardants as additives, which are physically blended as a mixture with the polymer. However, conventional flame retardant additives suffer from several drawbacks. Prior art additives modify the physical and mechanical properties of the polymer often in an undesirable or unpredictable way. There may also be compatibility problems with the additive and the polymer to which it is added. Additives can also be unacceptable for certain applications, especially for coatings, as they can migrate through the coating to the surface which can lead to blooming phenomena. Additives may also discolour the composition which is a particular issue for clear coatings. Furthermore the use of certain additives may not work well with radiation curable materials since the high concentration of additives could lead to incomplete curing because the additive absorbs radiation.

For all these reasons, co-polymerisable compounds containing phosphorous have been developed in which the phosphorous atom is linked to the backbone of a polymer precursor through a chemical reaction in which a covalent bond is formed. This method of incorporating phosphorous is advantageous because as the phosphorous moieties are permanently linked to the backbone of the resultant polymer, there is no blooming effect and there are no compatibility issues as can be the case when incorporating phosphorous containing additives. Use of phosphorous containing polymer precursors also has a reduced influence upon the physical and mechanical properties of the resultant polymer. For example solid flame retardant additives can undesirably increase the viscosity of a polymer to which they are added.

Polyester (polymers) are compounds (usually polymer compounds) containing at least 2 ester functionalities.

Radiation-curable polymers can be acrylate polymers i.e. polymers containing radiation-curable acrylate functionalities.

Polyester acrylates (PEA) and polyester urethane acrylates (PEUA) represent an important polymer class of radiation curable polymers as they are often used as polymer precursors to make polymer coatings (such as UV curable resins and UV curable powder coatings) for thermally sensitive substrates such as wood or MDF (medium density fiber). Therefore it is desirable to incorporate phosphorous in polyester acrylates to provide these polymers with intrinsic flame retardant properties, particularly as safety regulations become more stringent.

Phosphorous-comprising polyols useful in the preparation of flame-retardant coatings are disclosed in WO 00/52016. Polyesters are not disclosed.

U.S. 2002/0013391 discloses a flame retardant resin coating comprising a flame retardant base resin and a transparent resin top layer.

The base resin comprises color pigments giving a certain coloring to the coating material and, preferably, about 2,5 tot 50% by weight of a flame retardant additive. The base resin may comprise phosphorus-containing polyurethanes.

Water-soluble resins or resin precursor are not contemplated.

WO 01/74826 describes a co-polymerisable phosphorous containing polymer precursor which can be polymerised with other monomers to produce co-polymers such as phosphorous containing polyurethanes which for example have use as flame-retardants, anti-corrosives, pigment dispersants and/or adhesion promoters.

In many applications radiation curable resins require low viscosity. For example when the resins are applied to a substrate by a roller coater the composition should have a viscosity in the range of 500–10.000 mPa·s. When a curtain coater is used viscosities in the range of 150–250 mPa·s are preferred, for spray gun applications the viscosity should be in the range of 30–100 mPa·s and with a vacuum coater viscosities of 50–200 mPa·s are preferred. Low viscosities are typically achieved by adding acrylated monomers (also called dilution monomers).

On the other hand, high flame-retardancy performances require high phosphorous content (preferably 4 wt.-% elemental phosphorous). Addition of acrylated monomers as dilution monomers, however, decreases the phosphorous content and thus the flame-retardancy properties.

Thus, there is an ongoing need to find improved means for introducing phosphorous into organic materials to produce materials with improved properties effective for the uses and/or applications described herein and which are capable of being produced in an industrial scale economically. A demand exists for a simple and economical process for the preparation of compounds which comprises phosphorous atoms and which can be used as starting material in the preparation of more complex compounds exhibiting useful properties for the application and/or uses described herein (preferably for use in flame-retardancy), Moreover, there exists a demand for low viscosity radiation-curable resins, for example in coating applications.

Low viscosity is typically achieved by adding acrylated monomers (also called dilution monomers).

On the other hand, high flame retardancy performances require high phosphorus content. Addition of dilution monomers will decrease the phosphorous content and thus the flame retardancy properties.

It's desirable to find a way to decrease and adjust the viscosity of flame-retardant radiation-curable resins without decreasing the phosphorous content.

Documents show textiles products/fiber fabrics made with phosphorous-containing components:

JP 2001-159050 (Toyobo Co Ltd) describes obtaining antimicrobial stretchable fiber fabric comprising polyurethane fibers and hydrolyzed residues of a phosphorous-containing compound which imparts the antimicrobial effect. Hydrolysis is processed in a sodium hydroxide solution.

JP 1980-6 524 (Toyobo Co Ltd) describes water-dispersible polyester usable for surface modifiers or adhesives of textile products. The polyester is prepared by copolymerizing a compound having a metal sulfonate group, a polyalkylene glycol compound and a phosphorous-containing carboxylic acid.

Water-dispersibility is obtained thanks to ionic sulfonate functions possibly harmful to the polymer structure.

For both documents, no irradiation curing is envisaged. Also the contemplated field is not flame-retardant coatings.

It is an object of the invention to provide improved phosphorous containing materials which can solve some or all of the problems described herein for the prior art.

The applicant has developed a new class of improved phosphorous containing materials which exhibit utility in the applications described herein, for example having improved flame-retardant properties. The applicant has also discovered improved processes for preparing such materials which address some or all of the problems of the prior art such as those described herein. Moreover, the applicant has discovered that the phosphorous containing materials of the present invention are water-thinnable so that their viscosity can be easily adjusted by water-addition without use of dilution monomers. Thus, a high phosphorous content can be achieved in the final polymer because no dilution monomer is required to lower the viscosity. Water-thinnable means making more fluid by adding water as thinner (diluent).

The applicant has found that at least part of the above problems can be solved by hydrolysing phosphinate ester (P—O—C) bonds in a polyester polymer precursor.

Thus, the present invention relates to a process for preparing a water-thinnable phosphorous-containing polymer precursor which polymer precursor is a radiation-curable polyester, which process comprises the steps of (a) providing a polyester which comprises phosphinate ester (P—O—C) bonds and (b) hydrolysing at least part of said phosphinate ester (P—O—C) bonds. Moreover, the present invention relates to a water-thinnable phosphorous-containing polymer precursor which is obtainable from the above process as well as a flame-retardant composition comprising the above polymer precursor and a flame-retardant coating obtainable by curing such composition.

This invention permits to prepare water soluble halogen-free flame retardant UV curable resins with high stability toward hydrolysis and decantation.

1) easy to upscale: quantitative yields without any purification steps
2) hydrolysis step occurs in very short time/quantitative yields
3) low viscsoity can be achieved without use of dilution monomers
4) higher phosphorus content can be reached because no dilution monomers are used.
5) phosphorus group remains covalently bonded to the Polyester backbone 1) Other possible advantages of the invention are:a water thinnable polyester acrylate can be prepared without use of ionic functions (ex: DMPA: dimethylolpropionic acid; SSIP: sulfonic isophtalic acid) other than the phosphorus derivative. Less expensive and higher P content possible.
2) A transparent solution can be obtained: can be used for clear coating
3) homogen and stable with time and temperature: no decantation observed; no hydrolysis of the polyester backbone.
4) The target viscosity can be achieved by addition of water without detrimental effect on the FR performances (water can be evaporated).
5) non-toxic P derivative is used (no irritant for the eyes and skin) Some papers describe the analysis of fumes: these are considered as non toxic Possible Industrial applications are:
flame retardant coating for wood, MDF, HPL, plastic, paper, cardboard, cable, metal, optical fibres
anticorrosive coating
adhesion promotor
application for inks (good wetting pigment properties)

"Polyesters" in the sense of the present invention can be polymers and polymer precursors comprising a plurality of di- or polycarboxylic acid residues and a plurality of di- or polyol residues. The polyesters may additionally comprise further co-monomers such as in polyester acrylates or polyester urethane acrylate.

The polyesters used in the process of the present invention comprise at least one phosphinate ester (P—O—C) bond. A phosphinate ester is a compound of the formula RR'P(O)(OR"). In the sense of the present application phosphinate ester bonds are the bonds between the phosphorous atom and the oxygen atom of the OR" moiety and the oxygen atom and the first carbon atom of the OR" moiety.

Said phosphinate ester (P—O—C) bonds can be hydrolysed preferably in basic medium to form a RR'P(O)(O)— moiety and an HOR" moiety. The so-formed phosphinate salt residue imparts water-solubility and, thus, water-thinnability to the polymer precursor of the present invention: If hydrolysis is performed in water without base, the pH will become progressively acid (<7) due to the acid character of P—OH (phosphinic acid) and hydrolysis of the polyester-backbone may occur.

Preferably the phosphinate ester (P—O—C) bonds are located in one or more side chains of the polyester to avoid a cleavage of the polyester backbone during the hydrolysation step. If the phosphinate ester (P—O—C) bonds are in the side chain(s) of the polyester the phosphorous atom of said phosphinate ester (P—O—C) bonds forms part of the backbone of said polyester, i.e. the groups R and R' in the above general formula RR'P(O)(OR") form the polyester. Alternatively the phosphorous atom of the phosphinate ester (P—O—C) bonds is directly or indirectly bonded to the backbone of said polyester via a bond which is not said phosphinate ester (P—O—C) bond. In the latter case the phosphinate ester (P—O—C) bonds including their phosphorous atom are located within a side chain of the polyester such that when the hydrolysation step is carried out the phosphorous atom will not be cleaved from the polyester backbone and, in turn, is still present in the final polymer precursor obtained in the process of the present invention to impart the desired flame-retardant properties.

It is desirable that in the process of the present invention at least part of the phosphinate ester (P—O—C) bonds are hydrolysed selectively without hydrolysing the polyester backbone of the polymer precursor. It is also desirable that the hydrolysis of the phosphinate ester gives a water soluble product, (homegeneous; no decantation) and clear. It is also desirable that the pH of the water-thinnable resin is between pH 6 and 8 in order to avoid further hydrolysis of the polyester backbone with time. Applicant has found that these three desirable properties can be obtained by carrying out the hydrolysis step with a base in the presence of an alcoholic solvent. The alcoholic solvent can for example be selected from straight, branched or cyclic, saturated or unsaturated $C_{1-6}$-alkanols. Particularly preferred examples of the alcoholic solvent are methanol, ethanol, n-propanol, isopropanol, n-butanol, isobutanol and tert.-butanol.

The hydrolysis of the phosphinate ester (P—O—C) bonds in the process of the present invention is facilitated by the presence of a base that is preferably dissolved in water. The base is an organic or an inorganic base, preferably an inorganic base and more preferably a strong inorganic base. Preferably the base exhibits a $pK_B$ value below 4 and more preferably below 2. In this case, the hydrolysis step occurs in a very short time with quantitative yields and without any purification steps. Preferred bases are alkali metal hydroxides such as sodium hydroxide and potassium hydroxide. Mixtures of two or more different bases and/or two or more different alcoholic solvents can also be employed.

A preferred process of the present invention can be depicted in the following reaction scheme. This reaction scheme is not limitative and is given only to illustrate possible reaction and compounds.

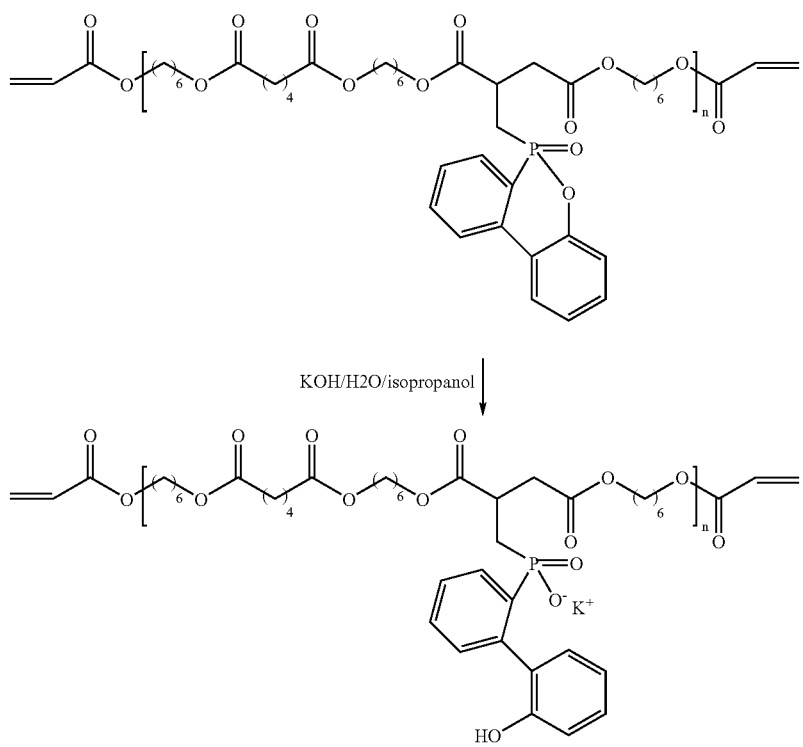

The polymer precursor obtainable from the above described process is useful for preparing a flame-retardant composition having a high phosphorous content because no dilution monomers are necessary to achieve a low viscosity because due to the hydrolysed phosphinate ester (P—O—C) bonds the polymer precursor is water-soluble and, thus, water-thinnable. Therefore the target viscosity can be achieved by the addition of water without detrimental effects on the flame-retardancy performance because the water is evaporated when applying the flame-retardant composition to a substrate surface. The viscosity of the polymer precursor obtainable by the process of the present invention and, thus, the flame-retardant composition of the present invention can easily by adjusted by the addition of water within a range of e.g. 10.000 mPa·s up to 50 mPa·s.

Preferably the polymer precursor obtainable by the process of the present invention is cured by UV or electron beam irradiation to form a flame-retardant coating on the surface of the substrate. Therefore, the polyester polymer precursor preferably comprises at least two acrylic or meth-acrylic groups so that the precursor can be cured by UV or electron beam irradiation. The polymer precursor preparable by the process of the present invention is preferably a polyester urethane acrylate and more preferably, polyester-acrylate.

It is believed that a new and advantageous product is obtainable by a process according to the present invention. Indeed, a water thinnable radiation curable resin based on a phosphorus based polyester acrylate can be obtained by a process comprising a selective hydrolysis of a phosphinate ester bond in the presence of an alcoholic solvent so as to obtain a fast hydrolysis and a water thinnable homogeneous and transparent resin. This occurs without hydrolysis of the polyester backbone.

Some advantageous properties of the water thinnable polyester acrylate according to present invention are believed to be:
1) new class of compound (new chemical structure)
2) high phosphorus content can be achieve because no dilution monomer is required to lower the viscosity (low viscosity required for the application like roller coater). High P content=good flame retardant properties.
3) excellent adhesion on wood substrates. Thus, it can be used as primer (base coat).
4) A coating based on water thinnable polyester acrylate can be overcoated with standart coatings (non phosphorus or halogenated based) without affecting negatively the Flame retardant performance of the all system. Thus excellent flame-retardant properties can be combined with excellent abrasion/scratch resistance
5) The viscosity can be adapted to the desired values. For example, the viscosity profile of a water thinnable polyester acrylate in function of added water (example 4) is:

| (Ex 4) diluted with water | Viscosity (B, 25° C.) (mPa · s) |
|---|---|
| 30% | 2440 |
| 40% | 1250 |
| 50% | 762 |
| 60% | 316 |
| 80% | 24 |

Radiation Curable Resins Require Low Viscosity in many applications:

It has been found the flame-retardant composition obtainable from the present polymer precursor may present an excellent adhesion on substrates such as wood.

Therefore, it is advantageously used to form a coating comprising a flame-retardant layer over a substrate, such layer (layer (1)) can be and is preferably a base coat (primer) on the substrate.

This primer that confer flame-retardancy can be overcoated with a further layer (layer (2)). Said further layer optionaly contains sublayers. Layer (2) often contains one or several sealers and a topcoat. Preferably, at least layer (2) is transparent. When layer (1) and layer (2) are both transparent, the substrate is visible and that is desired in many applications such as wood floors. At least, some of these other layers can be non flame-retardant layers, such as non-phosphorous or non-halogenated coatings without affecting negatively the flame-retardant performance of the all system. Thus, excellent flame-retardant properties can be combined with excellent abrasion and scratch resistance. Overcoatings with a or several sealers and a topcoat useful for the flame-retardant coatings of the present invention are for example described in EP-A-1 167 463 the content of which is incorporated into this application by reference.

In a further aspect of the invention, the FR-primer that confer flame-retardancy can be overcoated with one or several FR-sealers (100% solid), one or several sealers (non-phosphorus based) and a topcoat. The advantage is that the FR-primer can be applied in lower thickness and thus much less water has to be evaporated. The flame retardancy is thus confered by the primer and the first sealer.

The use of additives (non copolymerizable) can also be incorporated in one or several layers.

Commonly used definitions are:

A substrate is any material on which one or several layers are applied. It can be wood, MDF, HPL (high pressure laminate), paper, cardboard, plastics, cable, metal, optical fibres or combinations of these materials.

The MDF-wood substrate states for an MDF layer (+/−8 mm thickness) laminated with a beech veneer (+/−1 mm thickness) typically used for parquet flooring application.

A system is defined as the MDF-wood substrate coated with one or several layers.

A layer is a primer or a sealer or a topcoat.

A layer is applied in one or several times, for example by roller coater.

| Application methods Coating Technique | Products | Coating weight | Viscosity | Substrate |
|---|---|---|---|---|
| Roller coater | 100% UV | 5–30 g/m² | 500–10000 mPa · s | Flat |
|  | WB |  |  | Even thickness |
| Curtain | 100% UV |  | 150–250 mPa · s | Flat or |
| Coater | WB/PUD-UV | 80–100 g/m² | (40–60" DIN 4) | slight structure |
|  | (UV + solvents 5–10%) |  |  |  |
| Spray gun | (100% UV |  | 30–100 mPa · s | Flat or |
|  | WB/PUD-UV | 25–100 g/m² | (15–30" DIN 4) | 3-D |
|  | UV + solvents (20–60%) |  |  |  |
| Vacuum coater | 100% UV | 20–30 g/m² | 50–200 mPa · s | Profile |

A layer can be cured by UV or EB irradiation.

The primer is the first layer applied on a substrate. In the following examples (non limiting), the substrate is a MDF-wood subtrate. In the following examples, it is based on a water-thinnable polymer described in this invention. The water is preferably evaporated before UV-EB curing.

The sealer is the second layer applied on the primer. When two different sealers (i.e. with two different compositions) are applied, the first sealer is applied on the primer, the second sealer is applied on the first sealer.

The topcoat is the layer applied on the sealer. If two sealers are used, the topcoat is applied on the second sealer.

"FR" states for flame retardant, especially for phosphorus containing flame retardant, compositions. For example "FR-primer" means that the primer contains phosphorus In preferred embodiments of the invention, the sealer contains at least one layer whose composition is different from the primer water-thinnable layer. This at least one layer can be a FR layer or a non FR layer. In much preferred embodiments of the invention, a water-thinnable FR primer according to the invention is overcoated with a (sealer) FR non water-thinnable layer according to the patent application PCT/EP02/02390 whose content is incorporated herein by reference. The sealer layer is then preferably overcoated by a topcoat imparting desired appearance to the coated substrate. The sealer and topcoat can provide the required abrasion resistance especially for flooring applications. It has been observed that the whole coating may present together as well flame-retardancy as abrasion resistance properties, even if all layers over the FR water-thinnable primer do not have FR properties. In the much preferred embodiments were the coating contains 2 FR layers, the water-thinnable layer can be of lower thickness: the manufacturing process is thus facilitated (less water to be evaporated).

Preferably the sealer and the topcoat which imparts abrasion-resistance to the coating is transparent. The FR-primer is also preferably transparent.

In a further aspect the present invention relates to the use of the flame-retardant composition as described above for coating a substrate as well as a substrate at least part of which is coated with the flame-retardant coating of the present invention. As substrate for example wood, MDF, HPL, plastics, paper, cardboard, cable, optical fibres and metal is suitable. Moreover, the coating has not only flame-retardant properties but is also useful as anticorrosive coating, adhesion promotor (e.g. for metal substrates) and due to its good pigment wetting properties is applicable for inks.

In a preferred process the phosphorous-containing polymer precursor of the present invention can be prepared in a "First Process", wherein certain phosphorous-containing acrylatable (e.g. hydroxy- and/or carboxy-terminated) reactive oligomers ("First Polymer") are obtained. These First Polymers can be used in a "Second Process" to prepare (as a "Second Polymer") phosphorous-containing polyesters such as polyester acrylates and/or polyester urethane acrylates. This is because the plurality of acrylatable functional groups in the First Polymer (for example two or more hydroxy groups in the First Polymer are OH-terminated) can be acrylated without hydrolysis or transesterification side reactions at the oxyphosphorous bond. The Second Polymers can be used, after hydrolisation of at least part of the phosphinate ester (P—O—C) bonds, in a further (Third) Process to form Third Polymers (such as polymerized cross-linked polymer networks) useful for example as coatings.

Optionally the Third Process is performed in situ on for example an article coated with one or more Second Polymers.

Certain polyfunctional reagents described herein (components (i) to (iv) see below) react in a single pot polycondensation (First Process) to form a First Polymer.

The First Polymer is reacted with at least one acrylating agent to form a radiation-curable polymer precursor ("Second Polymer"). The term "acrylating agent" is used herein to refer to a compound comprising a) one or more optionally alkylated acrylate group(s), for example (meth)acrylic acid, (meth)acrylate; one or more alkyl(alkyl)acrylate ester(s), for example alkyl(meth)acrylate ester, preferably (meth) acrylic acid which can react with the first polymer by direct esterification or methyl(meth)acrylate ester and/or ethyl(meth) acrylate ester which can react with said reagent (or First polymer) by a transesterification reaction. The most preferred process is using acrylic acid (direct esterification).

The First Polymer can also be reacted with one or more oxiranating and/or isocyanating agent. The term "oxiranating agent" is used herein to refer to a compound comprising one or more oxiranyl group(s), for example oxirane(s) such as epoxides and/or oxetanes. The term "isocyanating agent" is used herein to refer to a compound comprising one or more isocyanate groups, e.g. —N=C=O. Collectively species which are (alkyl)acrylatable, oxiranatable and isocyanatable can be referred to herein as "reactive" as the context dictates.

The First Polymers may be represented schematically by the following general structure (which is by way of illustration only as should not be considered as limiting to scope of the invention):

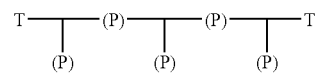

where T represents the (at least two) reactive groups such as hydroxy and/or carboxy and (P) denotes phosphorus groups which at any position on the polymer such as may be pendant from and/or incorporated into the main polymer chain (polymer backbone). The First Polymer is preferably a phosphorus-containing reactive polyester oligomer which may be dihydroxy or dicarboxy terminated.

The First Polymer can be reacted with many reagents (Second Reagents) in a Second Process to form a Second Polymer.

To form a Second Polymer of an acrylate urethane ester, the Second Reagents may comprise monoisocyanates, for example isocyanatealkyl(alkyl)acrylates, such as:

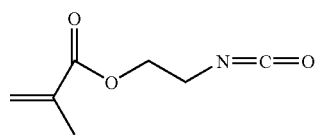

2-isocyanatoethyl methacrylate; and/or

-continued

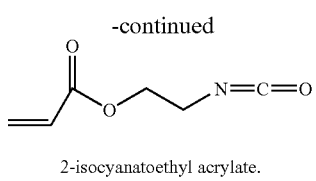

2-isocyanatoethyl acrylate.

To form a Second Polymer of an acrylate ester the Second Reagents may comprise (alkyl)acryloyl groups for example:

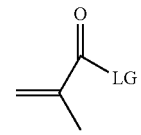     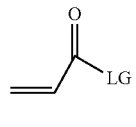

methacryloyl derivatives    and/or    acryloyl derivatives;

where in both the preceding formulae LG denotes a leaving group under the conditions of the Second Process such as halogen group (e.g. OH, Cl).

In preferred embodiments of the invention, the Second Reagent is acrylic acid.

To form a Second Polymer of a urethane acrylate and/or of a polyurethane acrylate dispersed and/or diluted in water, the Second Reagent(s) may comprise a plurality of (preferably two) isocyanate groups (i.e. comprise polyisocyanates).

To form a Second Polymer of a UV curable powder composition the Second Reagent(s) may comprise glycidyl (meth)acrylate groups.

In a preferred Second Process the First Polymer can be preferably (meth)acrylated (direct esterification) with (meth)acrylic acid or transesterified with (alkyl)(meth)acrylate esters to form a preferred Second Polymer which may be represented schematically by for example the following structure (which is by way of illustration only as should not be considered limiting to the scope of the invention):

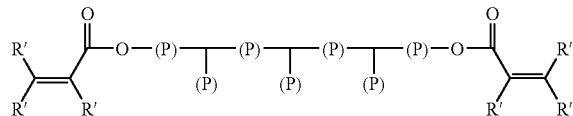

where independently each R' is typically H or alkyl such as methyl.

The Second Polymers comprise a new class of phosphorus containing polyester and/or urethane acrylates which can themselves be polymer precursor(s).

The Second Polymer can be further reacted with many reagents (Third Reagents) in a Third Process to form a Third Polymer.

The Second Polymer can also be used as the starting material in a Third Process of polymerisation (e.g. initiated by radiation) to form, as a Third Polymer, a phosphorus-containing polyester derived polymer. For example the Third Polymer may comprise the polymerisation product of a UV curable polyester acrylate or urethane acrylate after UV irradiation. The Third Process may optionally be carried out in situ (for example by UV irradiation of an article coated with a powder composition comprising the Second Polymer) to form as the Third Polymer for example a coating of a cross-linked polymeric network. Because such coatings contain phosphorous they may impart flame retardant properties to the coated article.

First Process

Therefore broadly in accordance with one aspect of the present invention there is provided a First Process for preparing a phosphorus-containing polymer precursor which polymer precursor is a radiation-curable polyester, the process comprising the steps of (a) mixing together:
  (i) a compound containing at least one hydrocarbylidenically unsaturated group and a plurality of carbonyloxy groups;
  (ii) optionally a compound having a plurality of carbonyloxy groups and optionally free of hydrocarbylidenically unsaturated groups,
  (iii) a polyol, and
  (iv) an oxyphosphorous-containing compound (component (iv)) in which the phosphorous atom has at least one P—C bond which is resistant to hydrolysis or transesterification under the reaction conditions herein; such component (iv) comprising compounds of formula (I) and/or effective isomers, salts and mixtures thereof:

(I):

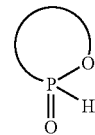

where,
  in formula (I): the phosphorous atom is substituted with at least one carbon atom to form at least one P—C bond; the P—O bond forms part of an organo ring, the ring being optionally substituted with one or more organo groups and/or optionally fused to one or more other organo rings;

(b) initiating polymerisation of the mixture to form a hydroxy and/or carboxy terminated phosphorous containing polyester oligomer ("First Polymer"), Preferably steps (a) and (b) are carried out in a single vessel, more preferably are simultaneous.

Compounds (I) to (iv) are not necessarily all distinct compounds. One can use, for example, a compound containing at the same time carbonyloxy groups, hydrocarbylidenically unsaturated groups and oxy-phosphorous groups. This would be the case of using a adduct of itaconic acid (compound (I)) with a compound (iv) containing oxy-phosphorous groups.

Preferably in step (b) the polymerisation is polycondensation. A catalyst component (v) may be present during step (a). If present, it is other than one selected from $PtCl_4$, $NiCl_4$, $PdCl_4$, platinium divinyl tetramethyldisiloxane, platinium cyclovinyl methyl siloxane and mixtures thereof.

Preferably, a catalyst is present during step (a) which catalyst (component (v)) comprises a tin complex catalyst.

Component (a)(i)

Preferably in step (a) of the First Process component (i) comprises a double bond-containing unsaturated dicarboxylic acid, acid anhydride; ester; other condensable derivatives thereof; and/or suitable mixtures thereof.

More preferably component (i) comprises those compounds of Formula I

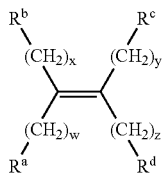

where
w, x, y and z independently represent 0 or 1;
at least two of $R^a$ to $R^d$ comprise a monovalent carboxy group or together comprise a divalent carbonyloxycarbonyl group; the remaining groups $R^a$ to $R^d$ independently representing H or optionally substituted $C_{1-15}$hydrocarbyl; and/or effective isomers, esters and/or salts thereof.

Most preferred compounds of Formula I are those where either w, x, y and z are all 0 or
one of w, x, y and z is 1 the rest being 0;
where the at least two of $R^a$ to $R^d$ which comprise a monovalent carboxy group or together comprise a divalent carbonyloxycarbonyl group is adjacent the methylene group;
the remaining groups $R^a$ to $R^d$ independently representing H or $C_{1-15}$hydrocarbyl; and/or effective isomers, esters and/or salts thereof.

Component (i) may usefully comprise at least one unsaturated diacid and/or anhydride selected from

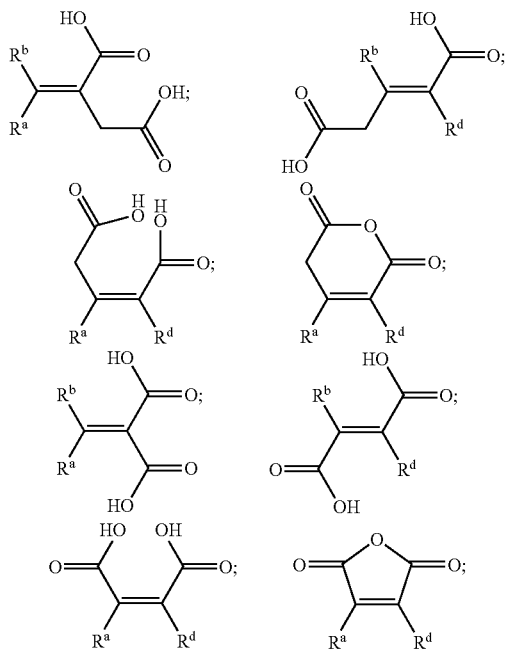

in which $R^a$, $R^b$, $R^c$ and/or $R^d$ independently represent as appropriate H or $C_{1-5}$hydrocarbyl;
and/or effective isomers, (alkyl)esters and/or salts thereof.
Specific unsaturated diacids and/or anhydrides which may comprise component (i) are:

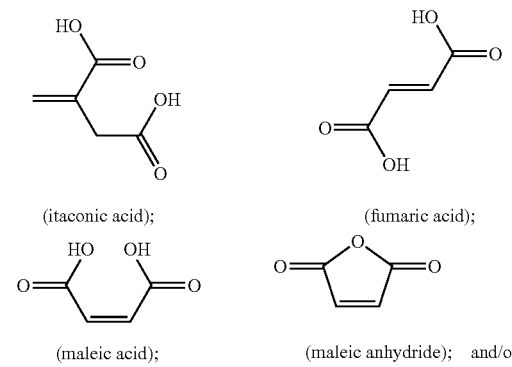

(itaconic acid); (fumaric acid);
(maleic acid); (maleic anhydride); and/or
effective isomers, (alkyl)esters and/or salts thereof.

To inhibit the self-polymerisation of component (i) (e.g. unsaturated dicarboxylic acids; anhydrides and/or their ester derivatives) it is preferred to add a double bond polymerisation inhibitor, for example, a quinone, such as hydroquinone, butyl quinone, dibutyl hydroquinone, methyl hydroquinone, during the First Process (e.g. polycondensation/ esterification reaction) of the present invention. The amount of the inhibitors added is preferably from about 500 ppm to about 3000 ppm based on the total amounts of ingredients in the reaction mixture.

Component (a)(ii)

Preferably in step (a) the optional component (ii) comprises a unsaturated or saturated dicarboxylic acid or an acid anhydride thereof. Most preferably component (ii) is saturated. Examples of saturated dicarboxylic acids, esters or anhydrides that may comprise component (ii) herein are one or more of: adipic acid (HOOC—$(CH_2)_4$—COOH), sebacic acid, azelaic acid, docecane dicarboxylic acid, diesters of these acids, and/or effective mixtures thereof.

Component (a)(iii)

Preferably in step (a) component (iii) comprises an saturated diol. More preferably diols that may comprise component (iii) comprise one or more of: ethylene glycol, 1,4-butane diol, 1,6-hexanediol, diethylene glycol, neopenthylglycol, isomers, alkoxylated derivatives thereof (usefully oxypropylated and/or oxyethylated derivatives thereof and/or effective mixtures thereof.

Component (a)(iv)

Conveniently in step (a) component (iv) (the oxyphosphorous containing compound) comprises a tertiary organo-substituted phosphorus atom (preferably comprising 3×P—C bonds thereon) or a secondary organo substituted phosphorus atom (preferably comprising 2×P—C bonds and one resistant oxyphosphorous bond (P—O) thereon).

A resistant oxyphosphorous bond denotes a P—O bond which does not hydrolyse and/or undergo transesterification under the conditions of the reaction (e.g. due to steric hindrance at the phosphorous and/or oxygen atom(s)) or where such hydrolysis and/or transesterification is readily reversible under the conditions of the reaction (e.g. where both the phosphorous and oxygen atoms of the P—O bond are ring atoms in a larger cyclic group).

More conveniently component (iv) comprises compounds of Formulae (I), as described herein and/or effective isomers, salts and/or mixtures thereof.

Compounds of Formula I are represented by:

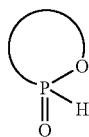

Formula (I)

In order to obtain a water soluble resin, at least one phosphinate ester with the following structure should be used:

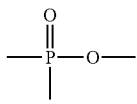

where the phosphorous atom is substituted with at least one carbon atom to form at least one P—C bond;
the P—O bond forms part of a larger organo ring (denoted by the arc of a circle in Formula II), the ring being optionally substituted with one or more organo groups and/or optionally fused to one or more other organo rings; and/or
effective isomers, salts and/or mixtures thereof.

Preferred compounds of Formula I comprise compounds of Formula 1

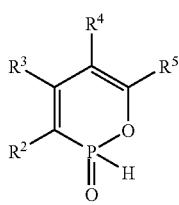

Formula 1 in which
$R^2$ to $R^5$ independently represent H or optionally substituted $C_{1-18}$organo group(s), a plurality of which may together represent one or more rings optionally fused to the oxyphosphorous ring to which they are attached; and/or effective isomers, salts and/or mixtures thereof.

More preferred compounds of Formula II comprise compounds of Formula 2.

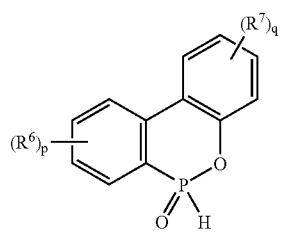

Formula 2 in which
p and q independently represent 0 or an integer from 1 to 4;

$R^6$ and $R^7$ independently in each case represent H or optionally substituted $C_{1-15}$hydrocarbo group(s) and/or optionally one or more rings (aromatic or non aromatic) fused to the benzene ring(s) to which they are attached; and/or effective isomers, salts and/or mixtures thereof.

A preferred compound of Formula I comprises that of Formula 3

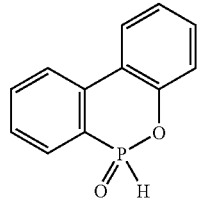

Formula 3

9,10-dihydro-9-oxa-10-phosphaphenantrene-10-oxide (also referred to herein as "DOPO") and/or effective isomers, salts and/or mixtures thereof Component (a)(v)
Conveniently the optional catalyst, if present, may be substantially free of any of the following: $PtCl_4$, $NiCl_4$, $PdCl_4$ siloxanes of Pt, (especially platinum divinyl tetramethyldisiloxane and platinum cyclovinyl methyl siloxane); and/or mixtures thereof. More conveniently the catalyst is substantially free of platinum, palladium, nickel, complexes and/or salts thereof. Most conveniently the catalyst may be other than a metal complex represented by formula $MX_4$ or $H_2MX_6$ where M is a metal of Group 10 (IUPAC) of the periodic table (=Group VIIIA in Europe and VIIIB in USA) and X is a halogen or a group of S, O or Si.

Preferably the optional catalyst used as component (v) herein comprises a main group metal (i.e. non transitional metal), complex and/or salt thereof, more preferably a metal, complex and/or salt of Group 14 (IUPAC) of the periodic table (=Group IVB in Europe and IVA in USA); most preferably comprises tin metal, complex and/or salt, for example the tin complex available commercially from Goldschmidt under the trade name Fascat 4102.

The amount of the catalyst used may be from about 0.001% to about 1% preferably from about 0.01% to about 0.1%, more preferably from about 0.01% to about 0.1% by weight based on the total amount of the other components.

The First Process of the present invention for preparing the First Polymer has several advantages compared to known methods of preparing prior art phosphorus-containing reactive polyester oligomers. These advantages may include one or more of the following:
excellent yields (very few side reactions, so purification is unnecessary);
inexpensive catalyst such as tin are used; (compared to Group 10 catalysts used in the prior art); and/or phosphorous groups can be readily introduced in any region in the polymer e.g. pendant from the polymer chain and/or within the main polymer backbone.

First Polymers
Another aspect of the invention provides as the First Polymer of the invention a phosphorus-containing reactive polyester oligomer obtained and/or obtainable from the First Process of the invention as described herein.

The First Polymers are preferably reactive (i.e. (alkyl) acrylatable; oxiranatable and/or isocyanatable) in a Second Process to form as a Second Polymer of the invention a phosphorus-containing unsaturated polymerisable polymer (see below).

Preferably the First Polymer has a molecular weight (Mn measured by GPC) less than about 5,000 daltons; more preferably from about 250 to about 4,000 daltons, most preferably from about 300 to about 3,000 daltons, for example from about 300 to about 2,000 daltons.

Preferably the First Polymer has a viscosity of from about 100 to about 70,000 mPa·s, more preferably from about 1000 to about 50,000 mPa·s, most preferably from about 10,000 to about 40,000 mPa·s. The viscosity values quoted herein are Hoppler viscosities measured at 60° C.

Preferably the First Polymer has a phosphorus content of from about 0.5% to about 10.0%; more preferably from about 2.0% to about 8.0%; most preferably from about 4.0% to about 7.0% by mass of the First Polymer.

Preferably the First Polymer has a polydispersity of at least about 1.1, more preferably from about 1.2 to about 4.0 and most preferably from about 1.5 to about 3.5.

Where the First Polymer comprises a plurality of hydroxy groups it may be used as the polyol component for the preparation of phosphorous containing urethane acrylate polymers. This method has several advantages over known methods for preparing urethane acrylates from phosphorus-containing polyols (such as described in WO 9502004 [DSM]), and such advantages may include one or more of those described herein.

The applicant's patent application WO 00/52016 (the contents of which are hereby incorporated by reference) describes polymer precursors formed by the reaction of an optionally substituted terminal phosphate or H-phosphonate ester with a compound comprising at least one oxiranyl, preferably epoxy, ring adjacent an alkylenylcarbonyloxy group. Therefore First Polymers of the present invention which comprise at least two hydroxy groups may also be copolymerised with the aforementioned polymer precursors described in WO 00/52016 to produce phosphorus containing polyurethanes copolymers which for example may have use as flame retardants, anti-corrosives, pigment dispersants and/or adhesion promoters.

However it is preferred that First Polymers are used as described herein in the Second Process of the present invention to form Second Polymers of the present invention (e.g. acrylated polyester polymer precursors).

If the First Polymer comprises a P—O single bond (for example if component (iv) in the First process comprises one or more compound(s) of Formulae 2, II, IIa, IIb) then preferably the P—O bond is not incorporated into the main polymer backbone (chain) of the First Polymer so hydrolysis of the P—O bond thereon does not lead to scission of the main polymer chain of the First Polymer (and Second and Third Polymers derived therefrom). If hydrolysis and/or transesterification occurs at the P—O bond on the First Polymer (and in Second and Third Polymers derived therefrom) this is reversible where for example the P—O bond forms part of a larger ring structure.

Second Process

The First Polymer is reacted, in a step (c), with at least one acrylating agent to form a radiation-curable polymer precursor ("Second Polymer").

Therefore broadly in a further aspect of the present invention there is provided as the Second Process of the invention a process for preparing a phosphorus containing polymer precursor (also referred to herein as the Second Polymer), the process comprising the step of reacting a First Polymer of the present invention as described herein, with at least one reagent (also referred to herein as the Second Reagent) comprising one or more (meth)acrylate, oxiranyl and/or isocyanate group(s).

Preferably the Second Reagent comprises an acrylate and/or oxiranyl group. More preferred Second Reagents are selected from: (meth)acrylic acids: (meth)acrylate (alkyl) esters; oxiranyloxy containing compounds; and most preferably from: (meth)acrylic acid and/or glycidyl(meth)acrylates.

More preferably the Second Process relates to the preparation of a phosphorus-containing polymer precursor (the Second Polymer) by direct (meth)acrylation of a phosphorus-containing reactive polyester oligomer (the First Polymer).

Due to the high hydrolytic resistance in the Second Process of the phosphorous carbon chemical bond of the First Polymer it is possible to react the First Polymer with the Second Reagent to form the Second Polymer without hydrolysis or transesterification side reactions.

An alternative preferred Second Process of the invention comprises the steps of:
a) reacting the First Polymer with a polyisocyanate to form an oligomer (which is preferably terminated with an isocyanate (NCO) group) and
b) end capping any residual isocyanate groups with a suitable end capping reagent (such as hydroxy(alkyl) acrylate);

to form, as the Second Polymer, a urethane polymer (for example a urethane acrylate polymer).

Isocyanates may be used in the Second Process as co(polymer precursors) with the First Polymer, to form as a copolymer the Second Polymer.

Organic isocyanates which may be used to prepare polyurethane Second Polymers are preferably polyisocyanates (i.e. have two or more isocyanate groups per molecule), more preferably di- or tri-isocyanates. The isocyanates may be aliphatic, cycloaliphatic and/or aromatic. Examples of suitable isocyanates comprise any of those disclosed in WO 00/52016 (which is hereby incorporated by reference) and especially those described on page 17, line 14 to page 18 line 6 of this reference. The total quantity of organic (poly) isocyanates used to prepare Second Polymers may be from about 10% to about 60% by weight of the Second Polymer.

If the Second Polymer comprises a phosphorous containing polyester urethane acrylate then the Second Process may be solvent free, preferably only reagents being used and optionally may also be free of any further purification, washing and/or isolation step(s) (work-up steps).

Therefore a preferred aspect of the Second Process of the invention comprises a further step where the reaction product is neutralised with a weak or strong base (preferably strong base) and water is removed from the reaction mixture before the resultant product is isolated. More preferably the Second Process comprises a final work up step in which the reaction product is neutralised in situ with a strong base (such as aqueous sodium hydroxide) the water is removed by azeotropic distillation and the resultant product is collected by filtration. This work up results in significantly less (preferably substantially no) mass loss of the hydrophillic Second Polymer and thus much higher yields can be obtained.

The Second Process of the present invention (or preferred features thereof) have several advantages which may include one or more of the following:

a means is provided for obtaining a new class of useful phosphorous containing polymer precursors (the Second Polymers);

there is a substantial reduction in side reactions such as transesterification and/or hydrolysis of oxyphosphorous groups;

excellent yields are obtained as no washing is necessary; so there is little mass loss of the hydrophillic Second Polymer; and/or the process is environment friendly as eliminating a washing step reduces waste products.

Second Polymers

Another aspect of the invention provides as the Second Polymer of the invention a phosphorus-containing polymer precursor obtained and/or obtainable from the Second Process of the invention as described herein.

The Second Polymers comprise phosphorus-containing polyesters with for example (meth)acrylate, oxiranyl and/or urethane groups and these can be considered as a novel class of polymer precursors.

Preferred Second Polymers comprise optionally substituted phosphorous containing polyester acrylates and optionally substituted phosphorous containing polyester urethane acrylates; more preferably phosphorous containing polyester alkyl(meth)acrylates.

The Second Polymers are phosphorus-containing polymer precursors with a high phosphorus content and can be used in the applications or uses described herein for example to confer useful properties to polymers. Thus the Second Polymers are particularly useful to prepare further polymers and/or compositions (such as the Third Polymers of the invention—see below) useful in at least one of the following applications: anti-corrosion, pigmentary dispersion; adhesion promotion and/or flame retardancy, especially flame retardancy. The Second Polymers may also have and/or impart such properties themselves.

Compositions comprising the Second Polymer can be cured in a very convenient way [e.g. by radiation (UV, EB) or thermal curing (with thermal initiators)] to generate a cross-linked network of polymer chains in situ (the Third Polymer) which form a coating and/or film of resin (such as polyurethane acrylate or polyester acrylate) which can be flame-retardant.

Preferably the Second Polymer has an average molecular weight ($M_n$) of from about 200 to about 5,000 daltons; more preferably from about 250 to about 4,000 daltons, most preferably 500 to about 3,000 daltons. Alternatively the Second Polymer may have a $M_n$ value of from about 1,000 to about 2,000 daltons. The $M_n$ value may be measured by any suitable technique such as GPC.

Preferably the Second Polymer has a phosphorus content of from about 0.5% to about 10.0%; more preferably from about 2.0% to about 7.0%; most preferably from about 3.0% to about 6.0% by mass of the Second Polymer.

Preferably the Second Polymer comprises optionally substituted phosphorous containing polyesters such as those selected from: polyester acrylates; polyester oxiranyl(alkyl) acrylates [more preferably polyester glycidyl(meth)acrylates]; polyester urethane acrylates; polyurethane dispersions (optionally cross-linkable and/or crosslinked); polyesters and/or optionally cross-linked and/or cross-linkable compositions, mixtures and/or networks thereof.

Preferably the Second Polymers comprises an average value for the number of repeat units per chain (denoted herein by "m") of from about 2 to about 100, most preferably from about 2 to about 50. Preferably the polymers of the invention comprise a mixture of polymer chains with a substantially Gausian distribution of chain lengths. Alternatively if m is 1, this represents a monomer.

Preferably the second polymer has a polydispersity of at least about 1.1. more preferably about 1.2 to about 4.0 and most preferably from about 1.5 to about 3.5.

In step (d) of the process, at least a part of the phosphinate ester (P—O—C) bands is hydrolysed. This permits to obtain water-thinnable phosphorous compound.

Third Process

A yet other aspect of the invention provides, as the Third Process of the invention, a polymerisation method for preparing a phosphorus-containing polyester derived polymer (also referred to herein as the Third Polymer) in which the method comprises a step of initiating polymerisation in the presence of the Second Polymer of the present invention which may for example be used as a reagent, and/or co-monomer in combination with other ingredients such as (co)monomers, polymer precursors, catalysts, initiators (e.g. photo-initiators), cross-linkers and/or other additives (e.g. flame retardant additives).

Flame retardant additives may be added during the Third Process to improve the flame retardant properties of the cured polymer (Third Polymer of the invention) with the advantage that they can be added at much lower loading to achieve a given flame retardant effect because the Third Polymer already has flame retardant properties. As such additives (if used) will be present in lower amounts, this limits their corresponding drawbacks.

Examples of suitable flame retardant additives comprise one or more of the following and/or any compatible mixtures thereof:

phosphorous containing additives such as DOPO, red phosphorous, ammonium phosphates; ammonium polyphosphates, melamine phosphates (e.g. melamine pyrophosphate and/or melamine orthophosphate), aliphatic organophosphorous additives (e.g. triethylphosphate, tributylphosphate, trioctylphosphate, triphenylphosphate and/or dimethyl methylphosphonate); oligomeric phosphorous compounds; trimethylolpropane methylphosphonate oligomer, pentaerythritol phosphates and/or polyphosphazene derivatives;

inorganic hydroxides such as aluminium trihydroxide, magnesium hydroxide, brucite, hydromagnesite, aluminium phosphinates, mixed metal hydroxides and/or mixed metal hydroxycarbonates;

inorganic oxides such as magnesium oxide; and/or antimony trioxide;

silicone, silica and/or silicate derivatives; and/or other inorganic materials such as magnesium calcium carbonate, barium metaborate; zinc borate, zinc hydroxystannate; zinc stannate; zinc metaborate; expandable graphite; and/or blends of vitreous materials that act as a flame retardant barrier (such as that available from Ceepree under the trade name Ceepree 200).

The flame retardant additives may optionally be surface treated to improve their compatibility with the polymers to which they are added. For example inorganic hydroxides may be surface treated with long chain carboxylic acid(s) and/or silane(s) as described in "Fire Retardancy of Polymeric Materials", edited by Arthur F. Grand & Charles A. Wilkie; Marcel Dekker Inc (5000), pages 285 to 352.

In the Third Process initiation of polymerisation may be achieved by any suitable means well known to those skilled in the art. Examples of suitable methods comprise: thermal initiation; chemical initiation by adding suitable agents;

catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles. Radiation, especially UV or electron beam (EB) radiation is the preferred initiation means.

The Third Process of the present invention (or preferred features thereof has several advantages which may include one or more of the following:
polymer coatings (Third Polymers) of novel structure and/or properties can be obtained; and/or
the process is environment friendly as no solvent is required in the case of UV or EB curing.

Third Polymers

Another still further aspect of the invention provides as the Third Polymer of the invention a phosphorus-containing polyester derived polymer obtained and/or obtainable from the Third Process of the invention.

Preferably the Third Polymer of the invention comprises a resin which Is substantially cross-linked to form a network of linked polymer chains which may form for example a film or coating and may contain one or more pendant phosphorus moieties within the polymer chain or network.

A yet still other aspect of the invention provides an (optionally flame retardant) coating composition comprising a Third Polymer of the present invention. Preferably the coating is a powder coating. Alternatively (or as well) a coating composition of the present invention may comprise a Second Polymer of the invention for example if the Third Process (polymerisation) is to occur in situ after the coating has been applied to an article.

Compositions of the invention may also comprise other ingredient(s) such as a carrier or diluent, conventionally used to formulate a composition and/or product effective (e.g. as a flame retardant) in the use for which it is designed. If the carrier or diluent comprises a resin, the resin may be selected to optimise any suitable property such as hardness or durability.

Compositions of the invention can be applied, e.g. as a coating, to any type of substrate, such as, in particular, wood, artificial wood (plastics and mix wood/plastics such as MDF), textiles, fibers, metals, paper and plastics, such as polyethylene and polypropylene. Such compositions can produce a coating which exhibits useful properties (such as flame retardancy) with good resistance to external conditions and/or other desirable properties for example good adhesion on substrates such as metals.

Irradiation curing technology has had, up to now, limited success in metal applications, mainly due to its basic principles. A typical UV formulation consists of acrylated oligomers and reactive diluents which, when cured, form a highly crosslinked coating layer having properties such as chemical resistance, scratch resistance and surface hardness. However, this high crosslinked density is often associated with shrinkage of the film, limiting adhesion and flexibility on metal substrates.

For metal applications such as coil coating, a high level of flexibility is essential for subsequent post-forming operations. For primers, good corrosion resistance is also necessary.

The water-thinnable phosporous-containing polymers according to this invention differ from these typical UV formulations in their behaviour on metal substrates. In addition to producing a coating that has flame retardant properties, the products show excellent adhesion and flexibility on metal substrates. The reduced viscosity of the products resulting from their water-thinnable character allows the application of thin coating layers of between 1 to 10 microns in one pass, even at room temperature. This is highly advantageous, especially for the application of a primer coating on a metal surface. The water-thinnable phosporous-containing polymer according to the invention is also advantageous for applications as thick and/or exposed coating layers.

Articles coated with a coating comprising a Third Polymer of the present invention also form part of the present invention.

A still yet further aspect of the present invention provides a) a product; b) a component for said product; and/or c) a consumable for use with said product, which comprises at least one First Polymer, Second Polymer and/or Third Polymer of the present invention and has utility in one or more applications and/or uses described herein; preferably selected from at least one of flame retardancy, anti-corrosion, pigmentary dispersion and/or adhesion promotion; more preferably flame retardancy.

Another aspect of the present invention provides use of at least one First Polymer, Second Polymer and/or Third Polymer of present invention in the manufacture of a) an effective product of the invention, b) component for said product (s); and/or c) a consumable for use with said product(s).

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclic groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen and/or sulphur, more preferably from hydrogen, nitrogen, oxygen and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group).

The term 'hydrocarbo group' as used herein is a sub-set of a organic group and denotes any univalent or multivalent moiety (optionally attached to one or more other moieties) which consists of one or more hydrogen atoms and one or more carbon atoms. Hydrocarbo groups may comprise one or more of the following groups. Hydrocarbyl groups comprise univalent groups formed by removing a hydrogen atom from a hydrocarbon. Hydrocarbylene groups comprise divalent groups formed by removing two hydrogen atoms from a hydrocarbon the free valencies of which are not engaged in a double bond. Hydrocarbylidene groups comprise divalent groups (represented by "R$_2$C=") formed by removing two hydrogen atoms from the same carbon atom of a hydrocarbon, the free valencies of which are engaged in a double bond; Hydrocarbylidyne groups comprise trivalent groups (represented by "RC≡"), formed by removing three hydrogen atoms from the same carbon atom of a hydrocarbon the free valencies of which are engaged in a triple bond. Hydrocarbo groups may also comprise saturated carbon to carbon single bonds; unsaturated double and/or triple carbon to carbon bonds (e.g. alkenyl, and/or alkynyl groups respectively) and/or aromatic groups (e.g. aryl) and where indicated may be substituted with other functional groups.

The term 'alkyl' or its equivalent (e.g. 'alk') as used herein may be readily replaced, where appropriate and unless the context clearly indicates otherwise, by terms encompassing any other hydrocarbo group such as those described herein.

Any substituent, group or moiety mentioned herein refers to a monovalent species unless otherwise stated or the context clearly indicates otherwise (e.g. an alkylene moiety may comprise a bivalent group linked to two other moieties). A group which comprises a chain of three or more atoms signifies a group in which the chain wholly or in part may be linear, branched and/or form a ring (including spiro and/or fused rings). The total number of certain atoms is specified for certain substituents for example C$_{1-r}$organo, signifies an organic group having from 1 to 'r' carbon atoms. In any of the formulae herein if one or more ring substituents are not indicated as attached to any particular atom on the ring, the substituent may replace any hydrogen atom attached to a ring atom and may be located at any available position on the ring which is chemically suitable.

Preferably any of organic groups listed above comprise from 1 to 36 carbon atoms, more preferably from 1 to 18. It is particularly preferred that the number of carbon atoms in an organic group is from 1 to 10 inclusive.

The term "polyol" is understood to mean a compound or polymer which comprises at least two hydroxy groups not bound to the same carbon.

The term oxirane is understood to mean a species comprising at least one oxiranyl radical (also referred to herein as an oxiranyl group). Oxiranyl radicals comprise a 3 to 6 membered saturated heterocyclic ring which contains one oxy group with a free carbon valence on the ring and/or a direct carbon bond from the ring to another organo moiety (e.g. where the oxiranyl group comprises part of a larger molecule).

Preferred oxiranyl radicals comprise epoxide radicals and/or oxetanyl radicals. An epoxide radical may be denoted by the general formula:

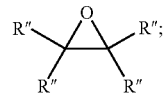

and an oxetanyl radical may be denoted by the general formula:

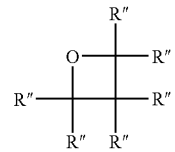

; where independently in each case R" denotes H and/or an organo group, (preferably H and/or hydrocarbo) and at least one R" denotes a direct carbon bond to another moiety or a free carbon valence. Compounds comprising respectively epoxide and oxetanyl radicals may be referred to respectively as epoxide(s) and oxetane(s).

Oxiranes includes monooxtranes with one oxiranyl radical and polyoxiranes which comprise at least two oxiranyl radicals for example polyepoxides such as diepoxides and/or polyoxetanes. Oxiranes comprises species where the oxiranyl group is terminal or internal, preferably terminal.

As used herein chemical terms (other than IUAPC names for specifically identified compounds) which comprise features which are given in parantheses—such as (alkyl)acrylate, (meth)acrylate and/or (co)polymer—denote that that part in parentheses is optional as the context dictates, so for example the term (meth)acrylate denotes both methacrylate and acrylate.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s), ingredient(s) and/or substituent(s) as appropriate.

The term 'effective' (for example with reference to the process, uses, products, materials, compounds, monomers, oligomers, polymer precursors and/or polymers of the present invention) will be understood to denote utility in any one or more of the following uses and/or applications: anti-corrosion, pigmentary dispersion; adhesion promotion and/or flame retardancy, preferably flame retardancy. Such utility may be direct where the material has the required properties for the aforementioned uses and/or indirect where the material is used as a synthetic intermediate and/or diagnostic tool in preparing materials of direct utility. Preferred uses are those which are necessary to provide improved protection and/or resistance to flame and/or a source of heat and/or ignition. When referring to the effective materials of the present invention it is preferred that the term 'optionally substituted' does not include halo containing species. As used herein the term "suitable" denotes that a functional group is compatible with producing an effective product.

The substituents on the repeating unit may be selected to improve the compatibility of the materials with the polymers and/or resins in which they may be formulated and/or incorporated to form a flame retardant material. Thus, the size and length of the substituents may be selected to optimise the physical entanglement or interlocation with the resin or they may or may not comprise other reactive entities capable of chemically reacting and/or cross-linking with such other resins.

Certain moieties, species, groups, repeat units, compounds, oligomers, polymers, materials, mixtures, compositions and/or formulations which comprise some or all of the invention as described herein may exist as one or more stereoisomers (such as enantiomers, diastereoisomers and/or geometric isomers) tautomers, conformers, salts, zwitterions, complexes (such as chelates, clathrates, interstitial compounds, ligand complexes, organometallic complexes, non-stoichiometric complexes, solvates and/or hydrates); isotopically substituted forms, polymeric configurations [such as homo or copolymers, random, graft or block polymers, linear or branched polymers (e.g. star and/or side branched), cross-linked and/or networked polymers, polymers obtainable from di and/or tri-valent repeat units, dendrimers, polymers of different tacticity (e.g. isotactic, syndiotactic or atactic polymers)]; polymorphs (such as interstitial forms, crystalline forms and/or amorphous forms), different phases, solid solutions; combinations thereof and/or mixtures thereof. The present invention comprises all such forms which are effective.

The polymers of the present invention (First, Second and/or Third Polymers) may be prepared using one or more suitable polymer precursor(s) (including where appropriate polymers of the present invention) which may be organic and/or inorganic and comprise any suitable (co)monomer(s), (co)polymer(s) [including homopolymer(s)] and mixtures thereof which comprise suitable polymerisable functionality for example moieties which are capable of forming a bond with the or each polymer precursor(s) to provide chain extension and/or cross-linking with another of the or each polymer precursor(s) via direct bond(s) as indicated in the Formulae herein. The polymer precursor(s) nay be substantially un-reactive at normal temperatures and pressures.

Preferably all the reagents, (and if required any optional solvents, catalysts and/or other materials) used in the processes of the invention are substantially free of halo (per se and/or as Impurities) so that the First, Second and/or Third Polymers of the invention so obtained are also substantially free of halo, without any further purification steps being required.

EXAMPLES

The present invention will now be illustrated by the following, non-limiting Examples, in which the following conventional techniques were used: acid numbers were measured using American Standard method (ASTM) D 974-64; hydroxy (OH) numbers were measured using ASTM E 222-73; isocyanate (NCO) numbers were measured using ASTM D 2572-87; Hoppler viscosity (denoted herein by "H") was measured at 25° C. using DIN 53015; colour was measured using the Gardner method as described in ASTM 1544-68; and phosphorus content was calculated as the percentage mass of phosphorus atoms compared to the total mass of the relevant product as the context dictates (denoted herein by P wt %).

Examples 1' to 5'

The First Process and First Polymers of the present invention will now be illustrated. A generic First Process for preparing a phosphorus containing reactive (polyhydroxy terminated) polyester oligomer (=First Polymer) is now described To a 4 litre reactor vessel having a heating jacket and equipped with a stirrer, were added: 'a' g of the diol 'b'; 'c' g of the diacid 'd'; 'e' g of 2-methenyl-1,4-butandioic acid (itaconic acid); 'f' g of 9,10-dihydro-9-oxa-10-phosphaphenantrene-10-oxide (also referred to herein as DOPO and available commercially from Schill & Seilacher under the trade name Struktol Polydis 3710): 2.0 g of 1,4 dihydroxybenzene (hydroquinone, an anti-oxidant); and 1.2 g of the tin catalyst available commercially from Goldschmidt under the trade name Fascat 4102. The reaction mixture was stirred and heated to 110° C. under a stream of nitrogen at a flow rate of 5 litres per hour. The mixture was held at this temperature for 4 hours and then heated to 180° C. until no more water distilled ('g' g of water produced from the esterification reaction was collected). When the acid value reduced to less than 10 mg KOH/g, the reaction mixture was heated at 180° C. under reduced pressure vacuum for 8 hours to remove residual water. The mixture was cooled at room temperature until $^{31}$P-NMR analysis confirmed that the addition of DOPO onto the unsaturated bonds of itaconic acid was complete (i.e. no free DOPO was detected) to give as product a phosphorous-containing polyester acrylate polymer with the following properties: Phosphorus content of 'h' % w/w; acid value ($I_{AC}$) of 'i' mg KOH/g; and hydroxy value ($I_{OH}$) of 'j' mg KOH/g.

In the generic First Process of the invention described above, the diol 'b' corresponds to component (iii); the diacid 'd' corresponds to optional component (ii); the itaconic acid corresponds to component (i); and the DOPO corresponds to component (iv). The specific Examples 1' to 5' (examples of First Polymers of the invention) were prepared by the above described generic First Process with reference to Table 1 below.

TABLE 1

| Ex | Diol wt 'a'/g | Diol 'b' | Diacid wt 'c'/g | Diacid 'd' | ITA wt 'e'/g | DOPO wt 'f'/g | H$_2$O wt 'g'/g | P wt % 'h'/% | $I_{AC}$ 'i' mg KOH/g | $I_{OH}$ 'j' mg KOH/g |
|----|---------------|----------|------------------|------------|--------------|---------------|------------------|--------------|------------------------|------------------------|
| 1' | 1,323.7 | DHE | 267.8 | ADP | 905.3 | 1503.2 | 240 | 5.57 | 8.2 | 108.2 |
| 2' | 1612.3 | TPG | 267.8 | ADP | 905.3 | 1503.2 | 240 | 5.39 | 11.25 | 25.75 |
| 3' | 1408.2 | HD | 290.5 | IPH | 865.0 | 1436.3 | 235 | 5.53 | 5.09 | 70.16 |
| 4' | 896.6 | HD | 0 | None | 790.3 | 1313.1 | 235 | 6.78 | 6.2 | 53.6 |
| 5' | 1067.0 | HD | 193.4 | ADP | 653.9 | 1085.7 | 180 | 5.39 | 9.2 | 71.4 |

In Table 1:

TABLE 1-continued

| Ex | Diol wt 'a'/g | Diol 'b' | Diacid wt 'c'/g | Diacid d'd' | ITA wt 'e'/g | DOPO wt 'f'/g | H₂O wt 'g'/g | P wt % 'h'/% | $I_{AC}$ 'i' mg KOH/g | $I_{OH}$ 'j' mg KOH/g |
|---|---|---|---|---|---|---|---|---|---|---|

DHE denotes 1,2-dihydroxy ethane (ethylene glycol);
TPG denotes tripropylene glycol;
HD denotes 1,6-hexane diol;
ADP denotes 1,6-hexanedioic acid (adipic acid);
IPH denotes 1,3-benzene dicarboxylic acid (isophthalic acid);
and ITA denotes 2-methenyl-1,4-butanedioic acid (itaconic acid.

In table 1: DHE denotes 1,2-dihydroxy ethane (ethylene glycol); TPG denotes tripropylene glycol; HD denotes 1,6-hexane diol; ADP denotes 1,6-hexanedioic acid (adipic acid) IPH denotes 1,3-benzene dicarboxylic acid (isophthalic acid); and ITA denotes 2-methenyl-1,4-butanedioic acid (itaconic acid.

Example 6'

Phosphorus Containing Polycarboxylic Acid Terminated Polyester (≡First Polymer)

A process for preparing a phosphorus containing reactive (polycarboxy terminated) polyester oligomer (≡First Polymer) is now described. To a suitable reaction vessel 1,256 g of 1,3 benzene dicarboxylic acid (isophthalic acid); 471.8 g of 2-methenyl-1,4-butanedioic acid (itaconic acid); and 1,061 g of 2,2-dimethyl-1,3-propanediol (neopentyl glycol) were admixed together with 0.25% of the tin polycondensation catalyst available from Goldschimdt under the trade name Fascat 4102. The reaction mixture was heated to a temperature of 235° C. When the reaction mixture became limpid a reduced pressure was gradually applied to the vessel and maintained until following characteristics were met: acid number: 42.5±2 mg KOH/g; and hydroxyl number: <4 mg KOH/g to form a polycondensation product which was then reacted directly with 784.1 g of DOPO which was added at a temperature of 200° C. The reaction mixture is then stirred for minimum of four hours at 200° C. to complete the addition reaction until the following characteristics were met: acid number: 35±3 mg KOH/g to give as product a phosphorus containing polycarboxylic acid terminated polyester. The reactive polymer precursor of Example 6 herein can be used directly in Example 14 to make a UV curable polyester useful in powder coating applications.

The Second Process and Second Polymers of the present invention win now be illustrated.

Examples 7' to 11'

A generic Second Process for preparing a phosphorus containing polyester acrylate polymer precursor (≡Second Polymer) is now described To a 1.5 litre double jacketed reactor vessel connected to an oil bath and equipped with a stirrer, was added 'a' g of the phosphorus containing reactive polyester oligomer (made as described in Example 'b'); 'c' g toluene; 'd' g propenoic acid (acrylic acid); 'e' g of 4-methylphenyl sulphonic acid monohydrate (p-toluenesulphonic acid monohydrate or PTSA.H₂O) and 'f' g of 4-methoxyphenol (mono methyl-ether hydroquinone or MEHQ—an antioxidant). The reaction mixture was stirred and heated under reflux until no more water is distilled.

The reaction mixture was cooled down to 50° C. and diluted with 'g' g of toluene. The reaction mixture was washed 3 times with 15% aqueous solution of sodium sulphate (10% by volume related to the organic phase) and the organic phase was recovered and heated to 85° C. in the presence of 'h' g of 4-methoxyphenol. Water was then removed by azeotropic distillation under reduced pressure. Once no more water separated, the organic mixture was filtered at 50° C. under pressure (6 bar). The same amount of additional 4-methoxyphenol ('h' g) and 'i' g of tris(para-nonylphenyl)phosphite (TNPP, CAS no. 26523-78-4, an antioxidant stabiliser) was added to the filtrate and the mixture was heated to 85° C. and toluene was removed by distillation under reduced pressure. When all the toluene had been removed 'j' g of 1,4-dihydroxybenzene hydroquinone or HQ- an anti-oxidant) was added to stabilise the resulting product.

Optionally the p-toluenesulphonic acid (PTSA) catalyst may be removed by precipitating it from the product using suitable base "k" (which may be a weak or a strong base) in which case an aqueous washing step is avoided which increases the yield of the highly hydrophlic product. However if a base is not used the product was simply washed with a 20% aqueous solution of Na₂SO₄.

In either case a phosphorus containing polyester acrylate polymer precursor was obtained which determined to have the following properties: the phosphorus content of 'l' % w/w; Hoppler viscosity (H, 60° C.) of 'm' mPa·s; colour measured following the Gardner method of 'n' G; acid value ($I_{AC}$) of 'o' mg KOH/g: and a hydroxy value ($I_{OH}$) of 'p' mg KOH/g.

Examples 7' to 11' (examples of Second Polymers of the invention) were prepared by the above described generic Second Process with reference to Tables 2 and 3 below.

TABLE 2

| Ex | Wt 1st Polymer 'a'/g | 1st Polymer 'b'/Ex | Tol wt 'c'/g | AA wt 'd'/g | PTSA.H₂O wt 'e'/g | MEHQ wt 'f'/g | Tol wt 'g'/g | MeHQ wt 'h'/g | TNPP wt 'i'/g |
|---|---|---|---|---|---|---|---|---|---|
| 7' | 500 | 1' | 245 | 72.1 | 8.58 | 1.22 | 191.0 | 0.48 | 0 |
| 8' | 750 | 3' | 346 | 74.6 | 17.3 | 1.73 | 478.6 | 0.58 | 2.3 |
| 9' | 750 | 4' | 529 | 56.9 | 19.8 | 1.98 | 277.9 | 0.66 | 2.65 |

TABLE 2-continued

| Ex | Wt 1$^{st}$ Polymer 'a'/g | 1$^{st}$ Polymer 'b'/Ex | Tol wt 'c'/g | AA wt 'd'/g | PTSA.H$_2$O wt 'e'/g | MEHQ wt 'f'/g | Tol wt 'g'/g | MeHQ wt 'h'/g | TNPP wt 'i'/g |
|---|---|---|---|---|---|---|---|---|---|
| 10' | 750 | 5' | 538 | 75.7 | 20.2 | 2.02 | 287.7 | 0.67 | 2.69 |
| 11' | 750 | 5' | 538 | 75.7 | 20.2 | 2.02 | None | 0.67 | 2.69 |
| 12' | 2000 | 5' | 1476 | 2770 | 55.4 | 5.54 | 370 | 1.84 | 1.84 |

TABLE 3

| Ex (cont.) | HQ wt 'j'/g | Base 'k' | P wt % 'l'/% | H (60° C.) 'm'/mPas | Colour 'n'/G | I$_{AC}$ - 'o' mg KOH/g | I$_{OH}$ - 'p' mg KOH/g |
|---|---|---|---|---|---|---|---|
| 7' | 0.12 | None | 5.1 | 17,250 | 1.5 | 10 | 20 |
| 8' | 0.23 | HMDA | 5.1 | NM | NM | 15 | 27 |
| 9' | 0.26 | HMDA | 6.4 | NM | NM | <15 | <15 |
| 10' | 0.27 | HMDA | 5.0 | NM | NM | <15 | <15 |
| 11' | 0.27 | NaOH 50% aq | 5.0 | NM | NM | 8.7 | 15.7 |
| 12' | 0.74 | None | 5.0 | NM | <4 | <15 | <20 |

In Tables 2 and 3: Tol denotes toluene; AA denotes acrylic acid; PTSA.H$_2$O denotes p-toluenesulphonic acid monohydrate; MEHQ denotes 4-methoxyphenol (mono methylether hydroquinone); TNPP denotes trisnonylphenylphosphite; HQ denotes 1,4-dihydroxybenzene (hydroquinone); HMDA denotes 1,6-hexamethylenediamine; and NM indicates the property was not measured.

Example 12'

Alternative Preparation of Polymer with Structure of Example 8 (≡Second Polymer)

A Second Polymer of the invention having the same structure as Example 8 herein, may solubilised as follows. To a double jacketed reactor of 0.5 litre connected to an oil bath and equipped with a stirrer were added 100 g of toluene and 200 g of the phosphorus containing reactive polyester oligomer of Example 8 (made analogously to the generic method described above and in Tables 2 & 3, the polymer having 1.63 meq DOPO/g). The reaction mixture was stirred and heated to 30° C. Then 7.6 g of sodium hydroxide in solution in 7.6 g water was slowly added to the reaction mixture. When the pH became neutral, 100 g of water was added and the reaction mixture was stirred for 10 minutes. The water phase, containing the water-soluble polyester acrylate, was decanted. $^{31}$P-NMR analysis of the water phase showed appearance of a new major peak (24.5–23.2 ppm) corresponding to the phosphinic sodium salt formed from hydrolysed DOPO).

Example 13'

Phosphorus Containing Polyester Urethane Acrylate (≡Second Polymer)

A phosphorus containing polyester urethane acrylate polymer precursor of the present invention was prepared as follows. To a one litre double jacketed reactor vessel connected to an oil bath and equipped with a stirrer, was added 404 g of the phosphorus containing diol (prepared analogously as described in Example 1', with an acid value of 108.2 mg KOH/g), 173.2 g of isophoronediisocyanate (IPDI) and 0.76 g of 1,4-dihydroxybenzene (hydroquinone-an anti-oxidant). The reaction mixture was stirred and heated to 70° C. Then 0.1 g of dibutyltindilaurate (DBTL, (C$_4$H$_9$)$_2$Sn(OOC$_{11}$H$_{23}$)$_2$) was added and the reaction mixture was stirred until the isocyanate value was lower than 1.35 meq/g. 1,6-hexanedioldiacrylate (HDDA) (254 g) was then added to lower the viscosity. The reaction mixture was cooled down to 60° C. and a mixture of 2-hydroxyethylacrylate (90.5 g) and dibutyltindilaurate (0.1 g) were added dropwise through a dropping funnel over a period of 30 minutes. After the exothermic reaction was completed, the reaction mixture was heated to 90° C. and stirred until the isocyanate value was lower than 0.15%. The mixture was then cooled down, and hydroquinone (0.76 g) and TNPP (0.76 g) were added to stabilise the resultant product which was a phosphorus containing urethane acrylate with the following properties: Hoppler viscosity (H, 60° C.)=9200 mPa·s and colour measured following the Gardner method <1G and residual NCO <0.15%.

Examples 1–9

Synthesis of Water-thinnable Phosphorus Polyester Acrylates

To a 1 litre (or 1.5 litre for ex. 5 and 5 litre for ex. 7 and 8) double jacket reactor vessel connected to an oil bath and equipped with a stirrer, was added 'a' g of the phosphorus containing polyester acrylate (obtained from 1$^{st}$ polymer; ex 5') and 'b' g ethanol (or toluene for ex. 1, mixture acetone-ethanol for ex.2, isopropanol for ex. 6, 7 8 and 9). The reaction mixture was stirred and heated to 40° C. to dissolve the polyester acrylate. 'c' g of potassium hydroxide (KOH) dissolved in 'd' g water (or methanol for ex. 1) was added to the reaction mixture. After 2 hours stirring at 40° C., 'e' g of 4-methoxyphenol (MeHQ) was added (for ex. 2 and 3, 'f' g water was also added) and ethanol (or isopropanol, toluene or acetone) was removed by distillation under reduced pressure (air sparge). The water content of the reaction mixture was measured by a Karl-Fischer titration and the mixture was diluted until h % water by adding 'f' g water.

| Ex | Wt 2$^{nd}$ Polymer 'a'/g | Wt ethanol, isopropanol, toluene or acetone 'b'/g | Wt KOH 'c'/g | Wt water or methanol 'd'/g | Wt MeHQ 'e'/g | Wt water 'f'/g | Viscosity (B, 25° C.) 'g'/mPa·s | Residual ethanol or isopropanol Wt % | H | T | WT | h |
|---|---|---|---|---|---|---|---|---|---|---|---|---|
| 1 | 100 | 50 toluene | 6.28 | 249 | 0.09 | 45 | NM | NM | y | y | y | 30 |
| 2 | 75 | | 3.89 | — | 0.07 | 62 | NM | NM | y | y | y | 40 |
| 3 | 100 | 100 ethanol | 7.91 | — | 0.06 | 113 | NM | NM | y | y | y | 40 |
| 4 | 250 | 250 ethanol | 22.0 | 105 | 0.15 | 45 | 2440 | 1.02 | y | y | y | 30 |
| 5 | 600 | 600 ethanol | 54.0 | 306 | 0.30 | 107 | 1776 | NM | y | y | y | 30 |
| 6 | 183 | 183 isopropanol | 16.6 | 94 | 0.09 | 28 | 2776 | NM | y | y | y | 30 |
| 7 | 1770 | 1770 isopropanol | 160.4 | 909 | 0.88 | 397 | 1258 | 3.20 | y | y | y | 30 |
| 8 | 2500 | 1346 isopropanol | 226.6 | 1284 | 0.48 | 527 | 3800 | 0.90 | y | y | y | 30 |
| 9 | 2318 | 1248 isopropanol | 210 | 1190 | 0.49 | 254 | 3300 | <2 | y | y | y | 25 |

H = homogen;
T = transparent;
WT: water-thinnable;
(y: yes/n: no);
NM: not measured

Examples 10–11 (Comparative)

The starting procedure for comparative examples 10 and 11 are the same:

To a 1 litre double jacket reactor vessel connected to an oil bath and equipped with a stirrer, was added 'a' g of the phosphorus containing polyester acrylate (ex 5'; first polymer) and 'b' g toluene. The reaction mixture was stirred and heated to 40° C. to dissolve the polyester acrylate. 'c' g of potassium hydroxide (or sodium hydroxide for ex. 10) dissolved in 'd' g water was added to the reaction mixture.

Example 10: illustrates a process conducted without alcoholic solvent

After 2 hours stirring at 40° C., 'g' g of 4-methoxyphenol (MeHQ) was added and toluene was removed by distillation under reduced pressure (air sparge). The water content of the reaction mixture was measured by a Karl-Fischer titration and the mixture was diluted until 25% water by adding 'h' g water. Product was not water thinnable (not homogeneous and not clear).

Example 11: illustrates a process conducted with catalytic amount of alcohol in the presence of a phase transfert agent After 2 hours stirring at 40° C., the pH was still 10.32. 'e' g isopropanol was added and after 5 hours maturation at 40° C. was the pH=8.37. 'f' g tetrabutylammoniumchloride (TBACl) was added to the reaction mixture (to act as phase transfer catalyst) but after 1 hour at 40° C., the pH was still 8.00. 'g' g 4-methoxyphenol (MeHQ) was added and toluene was removed by distillation (air sparge). The water content of the reaction mixture was measured by a Karl-Fischer titration and the mixture was diluted until 25% water by adding 'h' g water. The pH of the end product was 6.26. Product was not water thinnable (not homogeneous and not clear).

Flame Retardant Properties

The specific flame retardant properties of the water thinnable polymer of the present invention are illustrated by the following measurements:

radiant flooring panel (pr EN ISO 9239-1): flame retardant test dedicaced for flooring applications (horizontal test)

In this test, flame retardancy performances are translated by the critical radiant flux value (CRF): the higher the CRF is, the better are the FR performances.

In the following examples, flame retardancy as well as adhesion is confered by the primer when the primer is based on the water-thinnable polymer of the present invention.

The present invention show that it is necessary to combine at least a primer, a sealer or several sealers and a topcoat to combine the 4 properties with excellent results: flame retardancy, adhesion on the substrate, abrasion resistance and schratch resistance. These requirements must be fullfilled for flooring applications like parquet applications.

The following examples exemplify the the role of the three different layers:

The primer confer excellent adhesion on the MDF-wood subtrate and confer the flame retardancy properties.

The sealer and the topcoat confer the abrasion and scratch resistance. The sealer may also confer flame retardancy properties (see ex16).

Example 12

Shows the Flame Retardancy of a water thinnable FR-primer applied on an MDF-wood substrate.

| Ex. | Wt 2$^{nd}$ Polymer 'a'/g | Wt toluene 'b'/g | Wt KOH or NaOH 'c'/g | Wt water 'd'/g | Wt isopropanol 'e'/g | Wt TBACl 'f'/g | Wt MeHQ 'g'/g | Wt water 'h'/g | H | T | WT |
|---|---|---|---|---|---|---|---|---|---|---|---|
| 10 | 200 | 100 | 2.86 | 2.86 | — | — | 0.08 | 66.3 | n | n | n |
| 11 | 500 | 269 | 45.36 | 257 | 12.2 | 2.78 | 0.09 | 65.9 | n | n | n |

H=homogen; T=transparent; WT:water-thinnable; (y:yes/n: no)

| FR-primer 1 Composition | parts |
|---|---|
| 2nd polymer from ex 9 | 85 |
| Irgacure 500 | 3 |

| System | FR-primer 1 g/m2 (dry) | Sealer g/m2 | Topcoat g/m2 | Total weight g/m2 | CRF KW/m2 |
|---|---|---|---|---|---|
| FR-1 | 70 | 0 | 0 | 70 | 7.8 |
| Uncoated MDF-wood substrate | 0 | 0 | 0 | 0 | 5.8 |

Conclusion: the coated MDF-wood substrate with FR-primer 1 has a significantly higher CRF than the uncoated MDF-wood substrate and thus it has a significantly lower flamability than uncoated MDF-wood substrate.

Example 13 Shows the Flame Retardancy of a multilayer system based on a FR-primer, a sealer and a topcoat compared to an uncoated MDF-wood substrate:

The system 1 is defined as the MDF-wood substrate coated with 3 layers.

The compositions of the different layers are described in the following tabel:

| FR-primer 2 composition | parts | Sealer 1 Comp. | Parts | Topcoat 1 Comp. | parts |
|---|---|---|---|---|---|
| 2ndpolymer from ex 9 | 100 | Eb 4450 | 100 | DPGDA | 42 |
| Irgacure 500 | 5 | DPGDA | 10 | Eb 265 | 30 |
| Sibelco M 6000 | 10 | Irgacure 500 | 5 | Eb 810 | 10 |
| BYK 011 | 1 | | | BZO | 3 |
| | | | | Darocure 1173 | 2 |
| | | | | Syloïd 161 | 8 |
| | | | | Lancowax PP 1362 | 2 |
| | | | | PA 11 | 1 |

| System | FR-primer 2 g/m2 | Sealer 1 g/m2 | Topcoat 1 g/m2 | Total weight g/m2 | CRF KW/m2 |
|---|---|---|---|---|---|
| FR-2 | 100 | 54 | 8 | 162 | 10.6 |
| Uncoated MDF-wood substrate | 0 | 0 | 0 | 0 | 6.0 |

Conclusions:

A CRF value of 10.6 kW/m2 is obtained with the system FR-primer 2 and is close to the maximum (11 kW/m$^2$=PVC) in this test. In comparison, the uncoated MDF-wood substrate has a significantly lower CRF and thus has a significantly higher flamability.

Example 14

Example showing the FR performances of a system based on an FR-primer, a sealer and a topcoat in comparaison with FR performances of a system based on a FR-primer only.

This example shows that the sealer and topcoat do not negatively influence the FR performances when they are applied on the FR-primer.

| FR-primer 1 Comp. | parts | Sealer 1 Comp. | parts | Topcoat 1 Comp. | parts |
|---|---|---|---|---|---|
| 2ndpolymer from ex 9 | 85 | Eb 4450 | 100 | DPGDA | 42 |
| Irgacure 500 | 3 | DPGDA | 10 | Eb 265 | 30 |
| | | Irgacure 500 | 5 | Eb 810 | 10 |
| | | | | BZO | 3 |
| | | | | Darocure 1173 | 2 |
| | | | | Syloïd 161 | 8 |
| | | | | Lancowax PP 1362 | 2 |
| | | | | PA 11 | 1 |

| System | FR-primer 1 g/m2 | Sealer 1 g/m2 | Topcoat 1 g/m2 | Total weight g/m2 | CRF KW/m2 |
|---|---|---|---|---|---|
| FR-3 | 70 | 54 | 8 | 162 | 7.8 |
| FR-1 | 70 | 0 | 0 | 0 | 8.0 |

Conclusion: the CFR of system FR-3 is surprisingly not lower than system FR-1, whereas system FR-3 is coated with 65 g/m2 (54 g+8 g) of a non flame retardant sealer and topcoat.

Example 15

A system based on an FR-primer, a sealer and a topcoat having excellent FR performances compared to a non FR-primer overcoated with the same sealer and topcoat.

| FR-primer 1 Comp. | parts | Non FR-primer Comp. | parts | Sealer 1 Comp. | parts | Topcoat 1 Comp. | parts |
|---|---|---|---|---|---|---|---|
| 2ndpolymer from ex 9 | 85 | Eb 2100 | 80 | Eb 4450 | 100 | DPGDA | 42 |
| Irgacure 500 | 3 | Eb 12 | 20 | DPGDA | 10 | Eb 265 | 30 |
| | | Irgacure 500 | 1.5 | Irgacure 500 | 5 | Eb 810 | 10 |
| | | | | | | BZO | 3 |
| | | | | | | Darocure 1173 | 2 |
| | | | | | | Syloïd 161 | 8 |

-continued

|  | Lancowax PP 1362 | 2 |
|---|---|---|
|  | PA 11 | 1 |

| System | FR-Primer 1 g/m2 dry | Non FR primer g/m2 dry | Sealer g/m2 | Topcoat g/m2 | Total weight g/m2 | CRF KW/m2 |
|---|---|---|---|---|---|---|
| FR-2 | 100 | 0 | 54 | 8 | 162 | 10.6 |
| non FR-1 | 0 | 16 | 54 | 8 | 78 | 6.3 |

Example 16

Example with a FR-primer, two different sealers (FR and non FR) and a topcoat.

This example shows that it is possible to use the FR primer in very thin layer in combination with a FR-sealer (made according to the Patent Application WO/EP02/2390). The FR-sealer 1 is an 100% solid system based. Advantage of this system is that nearly no water has to be evaporated because the FR-primer is used in very thin layer.

| FR-primer 1 Comp. | parts | FR-Sealer 1 Comp. | parts | Sealer 2 Comp. | parts | Topcoat 1 Comp. | parts |
|---|---|---|---|---|---|---|---|
| 2ndpolymer from ex 9 | 85 | 2d polymer from ex 5' | 80 | Eb 4450 | 100 | DPGDA | 42 |
| Irgacure 500 | 3 | Eb 7100 | 5 | DPGDA | 10 | Eb 265 | 30 |
|  |  | DPGDA | 10 | Irgacure 500 | 3.5 | Eb 810 | 10 |
|  |  | talcum | 5 |  |  | BZO | 3 |
|  |  | Cristoballite M 6000 | 5 |  |  | Darocure 1173 | 2 |
|  |  | Irg 500 | 3 |  |  | Syloïd 161 | 8 |
|  |  |  |  |  |  | Lancowax PP 1362 | 2 |
|  |  |  |  |  |  | PA11 | 1 |

| System | FR-Primer 1 dry g/m2 | FR-Sealer 1 g/m2 | Sealer 2 g/m2 | Topcoat 1 g/m2 | Total weight g/m2 | CRF KW/m2 |
|---|---|---|---|---|---|---|
| FR-4 | 11 | 84 | 54 | 8 | 157 | 9.65 |

Example 17 (Comparative)

The flame retardant properties of system FR-2 was compared with those of a solvent based flame retardant coating in the radiant Flooring panel test (pr EN ISO 9239-1).

| System |  |  |  |  | Total weight g/m2 dry | CRF kW/m2 |
|---|---|---|---|---|---|---|
| FR-2 | FR-primer 1 g/m2 133 (wet) 100 (dry) | Sealer 1 g/m2 54 | Topcoat 1 g/m2 8 |  | 162 | 10.6 |

-continued

| System |  |  | Total weight g/m2 dry | CRF kW/m2 |
|---|---|---|---|---|
| Solvent based FR-5 | Solvent based FR-basecoat TU 22 (100) + hardener TH 222 (50) 300 g/m² (wet) 125 g/m² (dry) | Solvent based FR topcoat TZ 2200 (100) + TH 22 (50) 150 g/m² (wet) 125 g/m² (dry) | 225 | 6.2 |

The solvent based FR system is a clear polyurethane solvent based (50% solid) fire retardant system. It was applied on the MDF-wood susbtrate by roller coater following the instructions of the manufacturer (product sold under the tradename Sayerlack® from Hickson coatings).

Conclusion: the CRF of system FR-2 is higher than the solvent based system FR-5 even with a lower total weigh applied with system FR-2.

No organic solvent is released with system FR-2 compared to the solvent based system FR-5.

Example 18

Adhesion of a water-thinnable FR-primer according to the present invention

| FR-primer | Adhesion (tape) |
|---|---|
| FR-1 | 100% |

Conclusions: the water-thinnable polymer (FR-1) can be used as primer because of its excellent adhesion on the MDF-wood substrate.

Abrasion Tests

Example 19–24

Examples showing a much better abrasion resistance of a multilayer system based on a FR-primer according to the present invention than a solvent based FR multilayer system.

| System | FR-Primer 2 g/m2 | FR-Sealer 1 g/m2 | Sealer 1 g/m2 | Topcoat 1 g/m2 | Total weight g/m2 |
|---|---|---|---|---|---|
| FR-6 | 110 (dry) | — | 56 | 8 | 174 |

The abrasion measurements were done with the Grit Feeder (1 kg)

| | Ex 19 | Ex 20 | Ex 21 |
|---|---|---|---|
| Formulations | FR-6 174 g/m² | FR-4 157 g/m² | Solvent based FR system Comp. example FR-5 225 g/m² |
| Rel. Hum. | 49.1% | 55.5% | 38.9% |
| Temperature | 21.5° C. | 19.0 | 19.4° C. |
| After number of cycles | Weight loss in mg | Weight loss in mg | Weight loss in mg |
| 500 cycles | 40.9 | 46 | 143.7 |
| 1000 cycles | 67.3 | 72 | 268.0 |
| 1500 cycles | 89.7 | 94 | 361.6 |
| 2000 cycles | 107.8 | 118 | 446.5 |
| 2500 cycles | 126.7 | 140 | 524.0 |
| 3000 cycles | 148.3 | 160 | 602.4 |
| 3500 cycles | 167.5 | 177 | 685.7 |
| 4000 cycles | 188.5* | 192 | 762.0 |
| 4500 cycles | | 210 | 834.4 |
| 5000 cycles | | 230 | 904.1* |
| 5500 cycles | | 245 | |
| 6000 cycles | | 263 | |
| 9000 cycles | | 377 | |
| 11000 cycles | | * | |

-continued

| | Ex 19 | Ex 20 | Ex 21 |
|---|---|---|---|

Wheels were blown each 500 cycles and sanded each 10000 cycles
*= number of cycles after which the substrate becomes visible
Conclusions: FR-6 and FR-4 have much better results than FR-5 (ex 21)

The abrasion measurements were done with the Taber CS 17 (1 kg)

| | Ex 22 | Ex 23 | Ex 24 |
|---|---|---|---|
| Formulations | FR-6 174 g/m² | FR-4 157 g/m² | Solvent based FR system Comp. example FR-5 225 g/m² |
| Rel. Hum. | 46.1% | 56.5% | 38.9% |
| Temperature | 21.1° C. | 19.0 ° C. | 19.4° C. |
| Weight loss in mg | | | |
| 500 cycles | 37.1 | 44 | 86.9 |
| 1000 cycles | 60.2 | 80 | 150.6 |
| 1500 cycles | 87.1 | 130 | 209.2 |
| 2000 cycles | 122.3 | 184.5 | 267.5 |
| 2500 cycles | 150* | 236 | 320.1 |
| 3000 cycles | | 306 | 395.4 |
| 3500 cycles | | 370 | 483.0 |
| 4000 cycles | | 423* | 573.2 |
| 4500 cycles | | | 673.3 |
| 5000 cycles | | | 761.9 |
| 5500 cycles | | | 855.6 |
| 6000 cycles | | | 937.7* |

Wheels were blew each 100 cycles and sanded each 500 cycles.
*= number of cycles after which the substrate becomes visible
Conclusions: FR-6 and FR-4 have much better results than FR-5 (ex 24).

Example 25

Preparation and testing of a UV curable formulation for metal application.

A UV curable formulation was prepared by combining 90 parts of water-thinnable phosphorous polyester acrylate (as the second polymer from example 9), 5 parts of a photoinitiator (Irgacure™ 500 from Ciba), 5 parts of an amino-acrylate (Ebecryl™ 7100 from Surface Specialties UCB). The UV formulation was applied on HDG (hot dip galvanized steel), EZ (electrozinc steel), CRS (cold rolled steel), HRS (hot rolled steel) and copper panels by means of a 5–10 μn bar coater and exposed to UV radiation from a 80 W/cm non focalised medium pressure mercury vapor lamp to obtain a tack free film. Cross-hatch adhesion (ISO 2409), flexibility (T-bend test EN 13523-7), impact resistance (ISO/DIS 6272) and resistance to deformation (ISO 1520) on the different substrates were good in each case.

This shows that the film layer has good adhesion on various metal-pure or alloys-substrates even without adhesion promoter. Corrosion inhibitors can be added to the formulation to reach desired corrosion restance requirements.

Example 26 (Comparative)

Solubility of the phosphorus containing polyesteracrylate in water

To a 1 litter double jacket reactor vessel connected to an oil bath and equipped with a stirrer, was added '100' g of the phosphorus containing polyester acrylate (ex 5'; first polymer) and '100' g water. The reaction mixture was stirred and heated to 40° C. The polyester acrylate remained not soluble after 24 h.

This shows that no hydrolysis of the phosphorus-containing polyesteracrylate occurs with water alone. The phosphorus containing polyesteracrylate is not soluble in water.

The invention claimed is:

1. A process for preparing a water-thinnable phosphorous-containing polymer precursor which polymer precursor is a polyester, which process comprises the steps of
   (a) providing a polyester which comprises a plurality of di- or polycarboxylic acid residues and a plurality of di- or polyol residues and which comprises phosphinate ester (P—O—C) bonds and
   (b) hydrolysing at least part of said phosphinate ester (P—O—C) bonds.

2. A process as claimed in claim 1, in which at least part of said phosphinate ester (P—O—C) bonds are hydrolyzed selectively without hydrolyzing the polyester backbone of the polymer precursor.

3. A process as claimed in claim 1, in which at least part of said phosphinate ester (P—O—C) bonds are hydrolyzed in the presence of an alcoholic solvent.

4. A process as claimed in claim 3, in which the alcoholic solvent is selected from straight, branched or cyclic, saturated or unsaturated $C_{1-6}$-alkanols and in particular from the group consisting of methanol, ethanol, n-propanol, isopropanol, n-butanol, isobutanol and tert.-butanol.

5. A process as claimed in claim 1, in which at least part of said phosphinate ester (P—O—C) bonds are hydrolyzed in the presence of a base.

6. A process as claimed claim 1, in which the polyester comprises at least two (meth)acrylate groups.

7. A process as claimed in claim 1, in which the polymer precursor is a radiation-curable polyester, the process comprising the steps of
   (a) mixing together:
      (i) a compound containing at least one hydrocarbylidenically unsaturated group and a plurality of carbonyloxy groups;
      (ii) optionally a compound having a plurality of carbonyloxy groups and optionally free of hydrocarbylidenically unsaturated groups;
      (iii) a polyol, and
      (iv) an oxyphosphorous-containing compound (component (iv)) in which the phosphorous atom has at least one P—C bond and at least one P—O—C moiety which are resistant to hydrolysis or transesterification under the reaction conditions under steps (b) and (c); such component (iv) comprising a compound of formula (I) and/or effective isomers, salts and mixtures thereof:

(I):

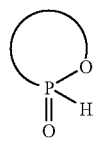

where, in formula (I): the phosphorous atom is substituted with at least one carbon atom to form at least one P—C bond; the P—O bond forms part of an organo ring, the ring being optionally substituted with one or more organo groups and/or optionally fused to one or more other organo rings;
   (b) initiating polymerization of the mixture to form a hydroxy and/or carboxy terminated phosphorous containing polyester oligomer ("First Polymer"),
   (c) reacting the First Polymer with at least one acrylating agent to form a radiation-curable polymer precursor ("Second Polymer"),
   (d) hydrolyzing at least part of the phosphinate ester (P—O—C) bonds in the Second Polymer.

8. A process as claimed in claim 7, in which component (IV) comprises a compound of formula II where $$R^1R^2R^3P{=}O$$

in formula (II): at least $R^1$ and $R^2$ independently represents $C_{1-20}$organo group substituted by one or more hydroxy and/or carboxy group; $R^3$ represents H or optionally substituted $C_{1-20}$organo group.

9. A process as claimed in claim 1, in which said phosphinate ester (P—O—C) bonds are in the side chain(s) of the polyester and the phosphorous atom of said phosphinate ester (P—O—C) bonds forms part of the backbone of said polyester or is directly or indirectly bonded to the backbone of said polyester via a bond which is not said phosphinate ester (P—O—C) bond.

10. A process as claimed in claim 1, in which the polyester comprises 9,10-dihydro-9-oxa-10-phosphaphenanthrene-10-oxide residues.

11. A water-thinnable phosphorous-containing polymer precursor obtained from the process as claimed in claim 1.

12. A flame-retardant composition comprising a polymer precursor as claimed in claim 11.

13. A flame-retardant coating comprising a flame-retardant layer over a substrate (layer (1)) which layer is obtained by curing a composition as claimed in claim 12.

14. A flame-retardant coating as claimed in claim 13, comprising at least one other layer (layer (2)) over the flame retardant coating, said other layer containing optionaly sublayers (2a, 2b . . . ).

15. A flame-retardant coating as claimed in claim 14, in which at least layer (2) is transparent.

16. A flame-retardant coating as claimed in claim 14, in which layer (2) imparts abrasion-resistance to the coating.

17. A flame-retardant coating as claimed claim 14, in which the layer (2) contains at least one flame-retardant sublayer.

18. Method for preparing a flame-retardant composition which comprises employing the polymer precursor of claim 11.

19. Method for coating a substrate which comprises applying to the substrate, the flame retardant composition of claim 12.

20. A substrate at least part of which is coated with a coating as claimed in claim 13.

21. A coated substrate according to claim 20, which substrate comprises wood, textile, fiber, metal or plastics.

22. The process as claimed in claim 5 wherein the base is a strong base.

* * * * *